United States Patent

[11] 3,626,099

[72] Inventor  Christian S. Le Bellec
              2 rue de Roud-ar-Roch, Lannion, France
[21] Appl. No. 67,925
[22] Filed     Aug. 28, 1970
[45] Patented  Dec. 7, 1971
[32] Priority  Aug. 29, 1969
[33]           France
[31]           6929728

[54] TELEPHONE CHARGING DEVICE
     2 Claims, 3 Drawing Figs.
[52] U.S. Cl. .................................................. 179/7 R
[51] Int. Cl. ................................................. H04m 15/00
[50] Field of Search ...................................... 179/7 R,
                                                          7.1 R

[56]                References Cited
                   FOREIGN PATENTS
     1,194,009  3/1964  Germany ..................... 179/7 R Primary Examiner—Kathleen H. Claffy
Assistant Examiner—Tom D'Amico
Attorney—Abraham A. Saffitz ABSTRACT: Charging device associated with a telephone exchange and receiving from the multiregister of the telephone exchange at the beginning of each call a charging word including the address of the caller, the charge rate and the charging mode assigned to the call and, at the end of the call, an end of call word. The charging word is received in an input register, then transferred into one of a plurality of charge circulating stores sequentially looped through a common processor. The processor selectively receives, from a charge clock, bits of predetermined frequency, said frequency depending upon the charge rate written in the charging word and accumulates these bits in the charging word. Means are provided to process differently the calls whose charge is independent of time and the calls involving the transmission of charge signals on the subscriber lines.

INVENTOR:
Christian S. LE BELLEC

TELEPHONE CHARGING DEVICE

The present invention relates to a telephone charging device.

There are various modes of charging subscribers depending on the regulations in force in different countries; these modes are generally different according as local calls or long distance calls are considered. For example, in some countries; local calls in manual service are charged independently of their duration and the same calls in automatic service are charges only in dependence upon their duration. The call duration is divided into charging periods having predetermined charges but the charge assigned to the initial charging period is often different from the charge of the subsequent charging periods. The long distance calls are generally charged in dependence of both the duration and the distance. The call duration is divided into charging periods whose individual duration depends on the distance and varies as an inverse function of the distance. The latter charging mode is often named charging by "periodic pulses."

Other distinctions are to be made in the charging procedure according to whether charging pulses are to be transmitted over the speech wires of his line to the subscriber or not. Such charging pulses are to be transmitted to subscribers having individual meters associated to their telephone sets and to advance-payment kiosks.

The data which are intended to establish the charge for a call comprise:
the address of the caller;
the charging mode (independence of duration; dependence of duration alone; dependence of both duration and distance);
the charging distinction (sending or not sending charging pulses);
the charge rate or level;
the chargeable duration.

All this data except the chargeable duration form a charging word and are transmitted to the telephone charging device by the multiregister of a switching network. The chargeable duration results from the time interval between the transmission of the charging word by the multiregister and the transmission of an end of charge word also transmitted by the multiregister.

In accordance with the invention, there is provided a telephone charging device, associated with a charge administration center and with a telephone exchange connected to a plurality of subscriber lines, arranged to receive from the telephone exchange, at the beginning of each call, a charging word comprising at least the address of the caller, the charge rate and charge data selectively concerning the independence and dependence of the charge upon time, and at the end of each call, a word signifying the end of the call, the device comprising an input register for receiving the charge words and the end of call words, means for converting the input register into a main circulating store, means connected to the main circulating store for reading out the charge data, a plurality of groups of charge circulating stores, each group comprising a plurality of charge circulating stores, a plurality of processors each associated with a group of charge circulating stores, a register for reading out the charge rate, means for sequentially looping the charge circulating stores of a charge circulating store group through the processor associated with this group, means for selectively transferring the charge word received in the input register into a word in a given charge circulating store, a generator for supplying, on a plurality of outputs, pulses of predetermined periods, means controlled by said charge rate reading-out register for selectively connecting one of the outputs of the generator to the processor associated with said given charge circulating store and for adding to the charge word the pulses supplied on the selected output until the end of call word appears, and means controlled by the charge data reading-out means for selectively transferring to the charge administration center the charge word circulating in the input register when the charge data concern the independence of the charge upon time and the charge word circulating in the given charge circulating store when the charge data concern the dependence of the charge upon time.

For applying a special process to the calls involving the transmission of charge signals on the subscriber lines, the charging word comprises further data concerning the said transmission.

The invention will now be described in more detail, by way of example and with reference to the accompanying drawings, in which.

Figure 1:
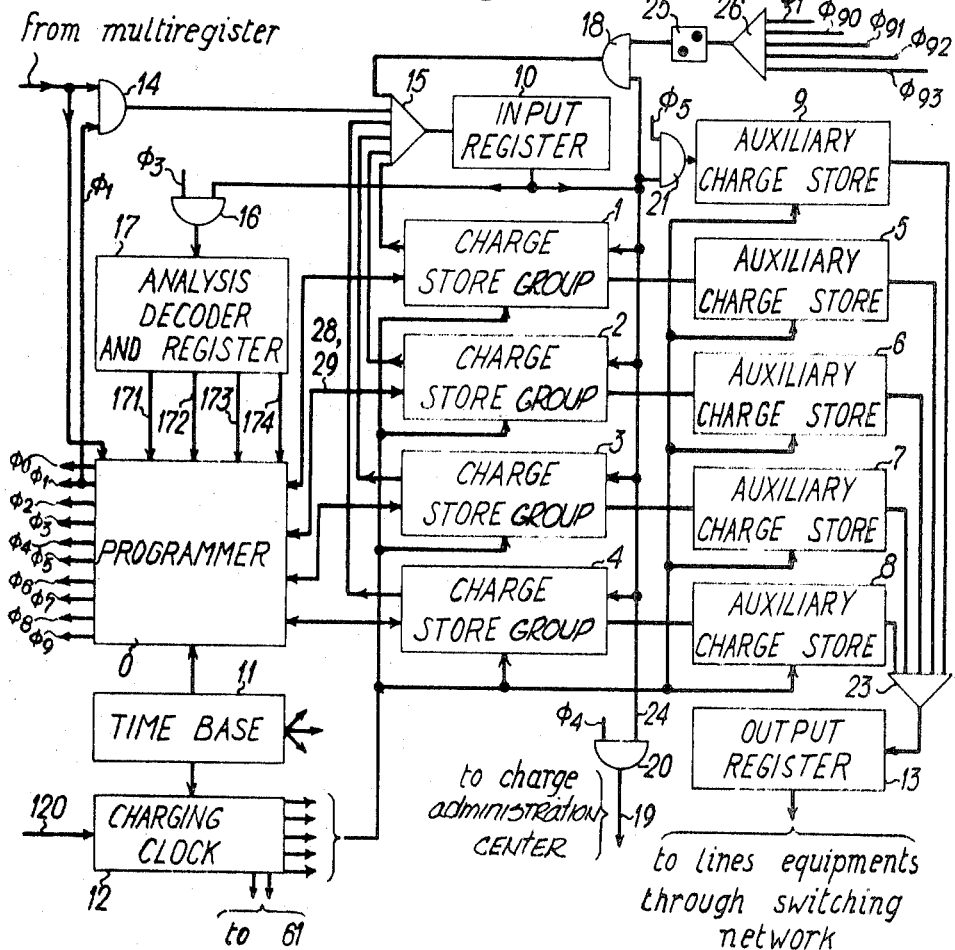
FIG. 1 shows, in the form of a block diagram, a charging device.

With reference to FIG. 1, the charging device comprises a programmer 0, an input register 10, an analysis decoder and register 17, a charging clock 12, charging store groups 1–4, auxiliary charging stores 5–9 and an output register 13.

A time-base 11 supplies clock pulses to the various circuits of the charging device. It also controls a charging clock 12 which supplies various signals involved in the charging operations. These signals are either pips having a period which is a submultiple of a minute, for charging by intervals of fixed duration for example, or pips having different and discrete periods of, for example, between 8 and 60 seconds, for charging by intervals of variable duration, which is known as charging by "periodic pulses." The charging clock is remote-controlled via a wire 120 for a change from normal tariff operation to reduced tariff operation.

Each charging word contains a first part which designates the charging mode: either a mode having a unit charging level independent of time or a mode having charging levels which only depend upon time or a mode having charging levels which depend both upon time and distance. A second part of the word designates which charging level is applicable to the call, while the first part also relates to whether the calling party is equipped with a remote-charge meter or is an advance-payment telephone kiosk. Each charging word also contains the address of the caller.

Charging words from the multiregister reach the input register 10 by way of an AND-gate 14 and an OR-gate 15. An analysis decoder and register 17 for decoding certain bits in the charging word is connected to the output of the input register 10 through an AND-gate 16. The charging mode, the charging level and the distinctions constituting directives are readout in the analysis decoder and register 17 and, according to these directives, the programmer 0 is controlled by one of wires 171, 172, 173 or 174. The programmer acts as a phase distributor providing phase signals $\Phi_1$ to $\Phi_9$ for programming the device, as will be further described below.

The output of the input register 10 is connected to an AND-gate 18 whose output is connected to the OR-gate 15, and to the inputs of the groups of charging stores 1–4. It is also connected through a line 24 and an AND-gate 20 to a line 19 providing an output to the charge administration center.

When a charging word arrives in the input register 10, the programmer 0 enters phase $\Phi_1$.

In phase $\Phi_1$, the AND-gate 14 is open and the charging word is received in the input register 10. In phase $\Phi_2$, the AND-gate 18 opens and the input register 10 then functions as a circulating store. In phase $\Phi_3$, the directives of the charging word are transferred into the analysis decoder and register 17 while the word continues to circulate in the register 10, the gate 18 receiving, via an inverter 25 and an OR-gate 26, phase signals corresponding to those phases for which the gate 18 is closed.

If the charge rate is unitary and independent of the duration, the analysis decoder and register 17 controls the programmer 0 via the wire 171 and the programmer enters phase $\Phi_4$. During this phase, the AND-gate 20 is open and the charging word circulating in register 10 is transmitted on line 19 to the charge administration center.

In the same circumstances, if the charging word also comprises a remote-charge distinction, the latter is readout by the analysis decoder and register 17; the programmer is then controlled by the wire 172 and emits phase $\Phi_5$. During this phase, an AND-gate 21 is open and the charging word is transferred into the auxiliary charging store 9, and then from the latter into the output register 13 via an OR-gate 23. The auxiliary store 9 is identical to the other auxiliary charging stores 5–8, one of which will be described below.

The output register 13 is connected to the control circuit of the switching network which, on receiving the word from register 13, forms remote-charge pulses and directs them, via the switching network and the speech wires of the subscriber's line, to the caller.

Figure 2:
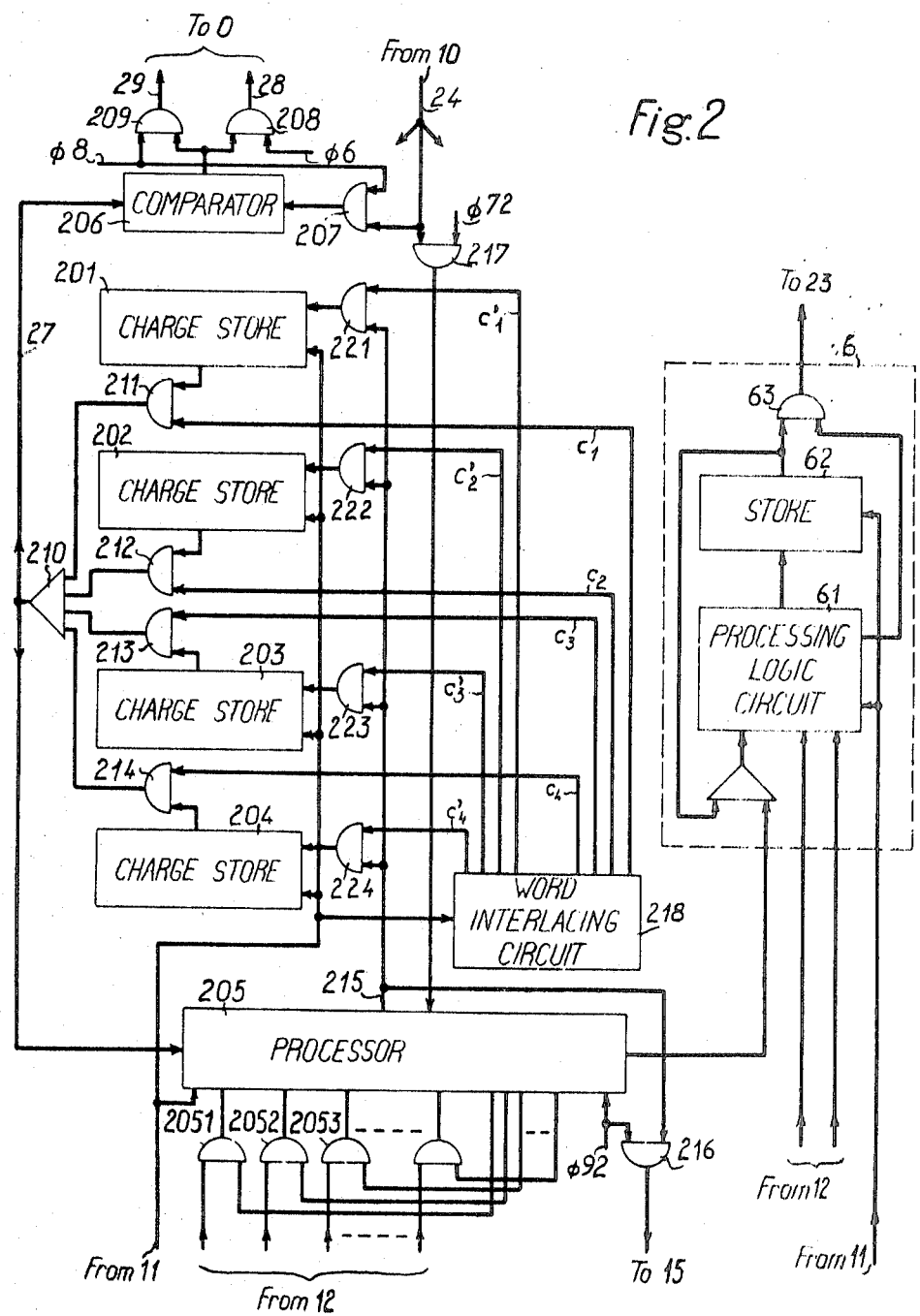
FIG. 2 shows, in a more detailed manner, charging store groups and auxiliary charging stores which appear in FIG. 1.

When the analysis decoder and register 17 has read bits indicating a charge depending upon duration in the directives, it controls the programmer 0 by way of the wire 173 and the programmer changes directly from phase $\Phi_3$ to phase $\Phi_6$. The processing sequence will now be explained with reference to FIG. 2.

Each of the groups of charging stores 1–4, for example group 2, consists of four circulating stores 201, 202, 203 and 204 which are associated with a central processor 205 and controlled by the time-base 11. The processor 205 also receives the charging clock pulses which relate to the different charging periods. A series comparator 206 compares the words emanating from the input register 10, which reach it through the wire 24 and the AND-gate 207, with those circulating in the stores 201 to 204, which reach it through the wire 27, the OR-gate 210 and the AND-gates 211 to 214 which are opened sequentially during successive square wave gating pulses $C_1$, $C_2$, $C_3$ and $C_4$ supplied by an interlacer 218. It is thus possible to process each of these stores in turn. The signals resulting from these comparisons are applied to the programmer 0 by wires 28 and 29, via gates 208 and 209 which are open in phases $\Phi_6$ and $\Phi_8$ respectively.

The charging stores 201–204 are looped back upon themselves through processor 205 in order to permit the circulation of the words which they contain, in a cycle of 8.125 milliseconds. The loop comprises a readout register and a writing-in register and a series adder contained in processor 205.

The charging stores 201–204 are looped back upon themselves through processor 205 in order to permit the circulation of the words which they contain, in a cycle of 8.125 milliseconds. The loop comprises a read-out register and a writing-in register and a series adder contained in processor 205.

The normal looping path is sequentially interrupted, when the interlacer 218 comes into action, to permit successive processing of the words by the processor 205. This is linked to the various stores, via the AND-gates 211 to 214 and the OR-gate 210, for the reading-out operations. The processor 205 also comes into operation to rewrite and, if necessary, modify the content of the charging words, via AND-gates 221 and 224. These receive the gating pulses $C'_1$ to $C'_4$ from the interlacer 218, and the signals to be written-in through a wire 215 from the processor 205. The processing cycle for the words is 32.5 msec. for all four stores. The outputs of the charging stores 201–204 are sequentially connected through the processor 205 to an AND-gate 216, and the output of the gate 216 is connected to the input gate 15 of the input register 10.

The comparator 206, whose input is monitored by the AND-gate 207 which is blocked during phase $0_6$, gives a positive comparison result when one of the circulating stores 201 to 204 presents a zero or free word to the other input of the comparator. The signal which results from the comparison is transmitted to the programmer 0 via an AND-gate 208 and a wire 28.

Since there is a wire such as 28 originating from each group of charging stores 1–4, it is possible for the programmer 0 to receive simultaneously signals from a number of charging store groups. The programmer 0 contains a priority circuit, of a known type, which selects one of the groups 1–4 when two or more are simultaneously in the calling condition. The priority may, for example, be the order 1, 2, 3, 4.

The discovery of a free word in one of the charging stores of a store group causes the programmer 0 to enter phase $0_7$, which is divided into phases $0_{71}$, $0_{72}$, $0_{73}$, $0_{74}$ according to which of the charging store groups 1, 2, 3, 4 is selected. If it is group 2 which is selected, the corresponding phase is phase $0_{72}$ which opens a gate 217. This gate permits the transfer of the word circulating in the input register 10 into the processor 205.

As already said, the processor comprises a read-out register, a write-in register and a series adder. The charging word from register 10 is written by the write-in register in the free word of the circulating store 202 and the charging level is read by the read-out register. The latter is associated with a decoder which unblocks whichever of a set of gates $205_1$, $205_2$, $205_3$,... transmits to the processor the charging level pips corresponding to the level which is read-out and coming from the charging clock 12. The processor 205 detects the arrival of a charging level pip, adds one unit to that part of the charging word which relates to the actual charge, and rewrites the charging word. The order to be sure that the addition of a unit is effected only once during a charging level pip, these pips have the same duration, namely 32.5 milliseconds, as one complete processing cycle of all four stores 201–204.

Phase $0_7$, like phase $0_4$ or phase $0_5$, is an end-of-processing phase, after which the programmer 0 enters the rest of phase $0_0$. Although it is possible, at the time of entry into the phase $0_0$, to restore the input register 10 to zero and stop its cycling, this is unnecessary since the arrival of a new word from the multiregister expels the data contained in register 10 by interrupting its looping during the reception phase $0_1$.

When the call has ended, the multiregister transmits an end of call word to the charging device. The composition of this word is different from that of the charging word sent when the call was in course of establishment, and the part of the charging word which relates to the charging level is now zero.

The phases $0_1$, $0_2$ and $0_3$ are the same as previously. Acted upon by the wire 174, the programmer passes from phase $0_3$ into phase $0_8$. During this phase, the gates 207 and 209 are open and the word circulating in register 10 is applied to the comparator. When the comparator recognized the identity of the caller's address in the word applied to it from register 10, and in the word circulating in one of the charging stores 201–204, it transmits a pulse, through the open gate 208 and wire 29 to the programmer 0, which enters the phase $0_9$. This, like phase $0_7$, is subdivided into subphases $0_{91}$, $0_{92}$, $0_{93}$, $0_{94}$ according to which of the charging stores, 201–204 respectively, contains the circulating word which is being sought. It will still be assumed that the charging store concerned is store 202.

In phase $0_{92}$, the gate 216 is open and the charging word sought is reintroduced into the input register 10. The word sought, which is circulating in the processor 205, is erased and the gate 18 for starting cycling of the input register is closed.

Phase $0_9$ is succeeded by phase $0_4$ which opens the gate 20, and this triggers the transfer of the charging word, the cycling of which in 10 has resumed, towards the charge administration center. There is then a return to phase $0_0$.

As has been already stated, parts of the directives in the charging word are constituted by distinctions relating to remote charging or charging by fixed periods. When the read-out register contained in processor 205 reads one of these distinctions, it has recourse to the auxiliary charging store, under certain time conditions. These conditions are: (1) in the case of remote charging, the appearance of the charging pip in question; and (2) in the case of charging by fixed periods, 15 seconds before imputation of the next charge.

The auxiliary charging store 6 is associated with the charging store group 2, and the processor 205 transfers a part of the charging word into the processing logic circuit 61. This partial word is recorded in a free word pigeon-hole in the store 62 by the processing logic group 61 which, like the processor 205, comprises a read-out register, a write-in register and a series adder. The store 62 is a magnetostriction line, with a delay of 125 microseconds. It can hold eight words of 20 bits.

The store 62 is looped through the processing logic circuit 61. The latter receives 125 microseconds pulses at intervals of 8 milliseconds and 125 microseconds pulses at intervals of 64 milliseconds from the charging clock 12. It adds one unit to the word circulating in store 62 on each circulating cycle which coincide with one of these pulses, to a total of 16 units. Thus one of two periods 8×16=128 milliseconds of 64×16≅1 second is obtained. The processing logic circuit 61 contains a decoder which, when it decodes the zero and 16 combinations, transmits a control signal formed by a pair of pulses to the switching network through an AND-gate 62, which is connected to the OR-gate 23 feeding the output register 13. Thus the auxiliary charging store produces a pair of pulses which are separated by 128milliseconds in the case of a remote-charge subscriber, and a pair of pulses which are separated by 1 second in the case of a subscriber who is charged by fixed periods. The two pulses separated by 128 milliseconds serve to generate remote-charge pulses having a duration of 128 milliseconds and separated by an interval which is equal to the period applicable to the call (case of charging by periodic pulses). The two pulses separated by one second serve to generate prior-deduction tone pulses.

So far the description has proceeded as though the circulating stores 201–204 were processed sequentially by the processor 205. They each have 65 pigeonholes for words of 160 bits, that is to say 10,400 bits, and a delay of 8.125 milliseconds. If one wishes to place the stores 201–204 in sequence, it would be necessary to have available a word counter, which can count up to 65. Processing is facilitated if, instead of interlacing the charging stores themselves, the words are interlaced; a counter which can count up to 4 is then sufficient.

Figure 3:
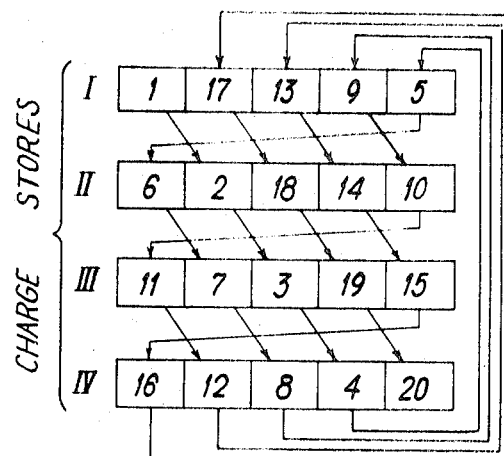
FIG. 3 is a diagram referred to in an explanation of the interlacing of charging store words.

FIG. 3 shows the order in which the words are applied to the processor 205, assuming the each charging store contains five words; in FIG. 3 the words of the four stores are numbered in a single series from 1 to 20, the first store comprising the words numbered 1+4$i$, the second store the words numbered 2+4$i$, the third store the words numbered 3+4$i$ and the fourth store the words 4+4$i$, $i$ taking the values 0 to 4. The first word No. 1 of the first charging store I, 1, is first applied to processor 205, then the second word No. 2 of the second charging store II, 2, the third word No. 3 of the third store III, 3 and the forth word No. 4 of the fourth store IV, 4, whereupon there is a return to I,5; II,6; III, 7; IV,8 and then to I,9; II,10; III,11; IV,12; I,13; and so on.

It has been assumed in FIG. 3 that each charging store has only five words instead of 65. It is possible to eliminate one charging store, for example store IV. The sequence then goes from word No. 3 (III,3) to word No. 5 (I,5), jumping over word No. 4 (IV,4). No special measures are necessary when eliminating a charging store.

It has been assumed in FIG. 3 that each charging store has only five words instead of 65. It is possible to eliminate one charging store, for example store IV. The sequence then goes from word No. 3 (III,3) to word No. 5 (I,5), jumping over word No. 4 (IV,4). No special measures are necessary when eliminating a charging store.

What I claim is:

1. A telephone charging device, associated with a charge administration center and with a telephone exchange connected to a plurality of subscriber lines, arranged to receive from the telephone exchange, at the beginning of each call, a charging word comprising at least the address of the caller, the charge rate and charge data selectively concerning the independence and dependence of the charge upon time, and at the end of each call, a word signifying the end of the call, the device comprising an input register for receiving the charge words and the end of call words, means for converting the input register into a main circulating store, means connected to the main circulating store for reading out the charge data, a plurality of groups of charge circulating stores, each group comprising a plurality of charge circulating stores, a plurality of processors each associated with a group of charge reading out stores, a register for reading-out the charge rate, means for sequentially looping the charge circulating stores of a charge circulating store group through the processor associated with this group, means for selectively transferring the charge word received in the input register into a word in a given charge circulating store, a generator for supplying, on a plurality of outputs, pulses of predetermined periods, means controlled by said charge rate reading-out register for selectively connecting one of the outputs of the generator to the processor associated with said given charge circulating store and for adding to the charge word the pulses supplied on the selected output until the end of call word appears, and means controlled by the charge data reading-out means for selectively transferring to the charge administration center the charge word circulating in the input register when the charge data concern the independence of the charge upon time and the charge word circulating in the given charge circulating store when the charge data concern the dependence of the charge upon time.

2. A telephone charging device, associated with a charge administration center and with a telephone exchange connected to a plurality of subscriber lines, arranged to receive from the telephone exchange, at the beginning of each call, a charging word comprising at least the address of the caller, the charge rate, charge data selectively concerning the independence and dependence of the charge upon time and further charge data selectively concerning the nontransmission and transmission of charge signals upon the subscriber lines, and at the end of each call, a word signifying the end of the call, the device comprising an input register for receiving the charge words and the end of call words, means for converting the input register into a main circulating store, means connected to the main circulating store for reading out the charge data, a plurality of groups of charge circulating stores, each group comprising a plurality of charge circulating stores, a plurality of processors each associated with a group of charge circulating stores, a register for reading out the charge rate, means for reading out the further charge data, means for sequentially looping the charge circulating stores of a charge circulating store group through the processor associated with this group, means for selectively transferring the charge word received in the input register into a word in a given charge circulating store, a generator for supplying, on a plurality of outputs, pulses of predetermined periods, means controlled by said charge rate reading-out register for selectively connecting one of the outputs of the generator to the processor associated with said given charge circulating store and for adding to the charge word the pulses supplied on the selected output until the end of call word appears, means for sending on the subscriber lines charge signals, means controlled by the charge data reading-out means for selectively transferring to the charge administration center the charge word circulating in the input register when the charge data concern the independence of the charge upon time and the charge word circulating in the given charge circulating store when the charge data concern the dependence of the charge upon time, and means controlled by the further charge data reading-out means for actuating said charge signals sending means.

* * * * *